United States Patent [19]

Dudas

[11] Patent Number: 5,030,818

[45] Date of Patent: Jul. 9, 1991

[54] COMPOSITE WIRE ELECTRODE

[76] Inventor: David J. Dudas, 310 North Park Avenue, Easton, Conn. 06612

[21] Appl. No.: 400,403

[22] Filed: Aug. 28, 1989

[51] Int. Cl.$^5$ .......................... B23H 1/06; B23H 7/08; C22C 29/02

[52] U.S. Cl. .................................. 219/69.12; 75/243; 219/69.15; 419/11

[58] Field of Search ............. 219/69.15, 69.17, 69.12; 420/470, 477; 148/432, 434; 419/11; 75/243

[56] References Cited

U.S. PATENT DOCUMENTS

| | | | |
|---|---|---|---|
| 1,067,003 | 7/1913 | Deats et al. ............................ | 75/243 |
| 2,786,128 | 3/1957 | Limes .................................... | 148/432 |
| 3,208,846 | 9/1965 | Bruma .................................... | 148/432 |
| 3,384,463 | 5/1968 | Olstowski et al. ................... | 148/432 |
| 3,661,571 | 5/1972 | Hintermann et al. ................. | 75/243 |
| 4,000,981 | 1/1977 | Sugafuji et al. ....................... | 75/243 |
| 4,193,852 | 3/1980 | Inoue ................................. | 219/69.12 |
| 4,207,096 | 6/1980 | Suwa et al. .......................... | 148/432 |
| 4,341,939 | 7/1982 | Briffod et al. ...................... | 219/69.12 |
| 4,459,453 | 7/1984 | Inoue ................................. | 219/69.17 |
| 4,758,404 | 7/1988 | Muto ....................................... | 419/11 |
| 4,941,919 | 7/1990 | Asada et al. ........................... | 75/243 |

FOREIGN PATENT DOCUMENTS

| | | | |
|---|---|---|---|
| 34008 | 8/1981 | European Pat. Off. ......... | 219/69.15 |
| 114820 | 7/1983 | Japan ............................... | 219/69.15 |
| 155127 | 9/1983 | Japan ............................... | 219/69.15 |
| 61-90832 | 5/1986 | Japan ............................... | 219/69.15 |
| 282819 | 12/1987 | Japan ............................... | 219/69.15 |

Primary Examiner—Geoffrey S. Evans
Attorney, Agent, or Firm—Kramer, Brufsky & Cifelli

[57] ABSTRACT

An electrical discharge machining wire electrode and a process of forming the wire electrode. The electrode comprises a primary constituent selected from the group consisting essentially of brass copper and alloys thereof and a secondary constituent essentially of about 3 to about 40 percent by weight of graphite.

15 Claims, 1 Drawing Sheet

COMPOSITE WIRE ELECTRODE

While the present invention is subject to a wide range of applications, it is particularly suited for wire-cut electrical discharge machining. In particular, it is directed to an improved material composition for an electrical discharge machining wire electrode which provides unique properties and characteristics.

Electrical discharge machining (EDM) is a process that removes metal utilizing the damaging effects of closely controlled electrical sparks between two conducting surfaces immersed in a dielectric medium.

To illustrate this method of metal removal, consider the following mechanical analogy. A projectile hits a solid surface and the resulting impact causes particles of that surface to be ejected into the air, leaving a crater. A surface which is subjected to a continuous bombardment from a great number of projectiles presents a very altered and distinctive appearance. The level of the surface is further reduced when there is a wind of sufficient force capable of blowing away the debris as it is hurled into the air. The rate of surface erosion and its final appearance depend upon the size and speed of the projectiles, their quantity and frequency, and the effectiveness of the wind in carrying away the debris.

Reverting from this analogy to conditions that occur in the EDM process, the projectiles are replaced by a series of electrical discharges between an electrode and a workpiece, and wind action is accomplished by a flow of dielectric fluid. An electric spark results when an applied potential between two conducting surfaces separated by a dielectric medium reaches the point at which the accumulation of electrons acquire sufficient energy to bridge the gap between the surfaces. At this point, the electrons cross the dielectric gap and, moving from negative to positive, impinge upon the positively charged surface.

In conventional EDM applications, the dielectric medium is typically a hydrocarbon oil which totally immerses the work area. Immediately following breakdown of the dielectric oil, an ionized channel is formed between electrode and workpiece. The discharge column flows through the channel and on initial contact with the work piece contains a very high current density; however, this current density decreases as the circuit is completed because the discharge column rapidly expands. Due to the heat generated, a gas bubble is formed around the discharge column which expands continually until the discharge is terminated.

The initial bombardment of electrons heats the area of impact and vaporizes a small portion of workpiece material. As the discharge continues, the impact area increases and vaporization action is replaced by a melting that results in a pool of molten material. The temperature gradient creates tremendous pressure in the molten material which is counteracted by pressure in the dielectric vapor bubble. At the end of the discharge period, the bubble collapses and the molten material is then ejected from the impact area, leaving a crater. Ejected material solidifies and is swept away by the dielectric flow in the form of small spheres.

One important point is that at any one point in time, on a single lead output generator, only one spark is occurring.

The conventional EDM process incorporates an electrode having one end which engages the part being machined. This electrode is made with a cross-sectional form conforming to the shape of the area over which the metal is to be removed. The electrode typically has a substantial size so as to be rigid. As the spark from the electrode end erodes the metal being machined, the end of the tool electrode is also eroded. Accordingly, it is the practice to reshape the ends of the tool electrodes at frequent intervals. Examples of conventional EDM processes incorporating this type of operation are disclosed in U.S. Pat. Nos. 3,208,846 and 3,648,013.

The specific material from which conventional electrodes are formed has been an important consideration receiving attention in the EDM industry. Typical examples of materials for conventional electrodes include copper, brass and graphite. Bearing in mind that electrodes are typically rigid structures, the prior art has disclosed a number of variations in the material being used to form the electrodes.

For example, Suwa et al. U.S. Pat. No. 4,207,096 is directed to the method of producing a copper-graphite particle composite alloy wherein the metal of the copper base alloy contains either titanium, chromium, zirconium and/or magnesium. The graphite particles are chemically plated with copper and then added at a rate of about 5-30% by volume into a melt of the copper alloy. In the case where the copper coated graphite particles were added into melts of pure copper or brass, the graphite particles did not remain in a homogeneous dispersion throughout the melt. Suwa et al. can be distinguished from the present invention wherein the graphite is added to molten brass or molten copper, a method which is specifically discussed as being inoperative in the Suwa et al. patent.

Another example, Weglarz U.S Pat. No. 3,035,151, discloses a spark machining tool wherein a tool electrode is formed of a composite material consisting of dispersed graphite or other particles in the pores of a metal layer. Molten metal is sprayed on a wooden pattern. Then a graphite coating, preferably in colloidal solution, is applied and worked into the pores of the metal coating by mechanical means. Note that copper can be selected for the metal coating. Weglarz can be distinguished from the present invention in that it does not disclose a wire electrode wherein a matrix of copper or brass has graphite dispersed therein.

Other prior art includes Lines U.S. Pat. No. 2,786,128 which discloses a spark machining tool incorporating a tool electrode formed of a composite material consisting of a dispersion of graphite or other particles in a metal matrix of good electrical conductivity. The matrix is disclosed as preferably being copper and the dispersion particles of graphite. The material composition is disclosed with a range of 16 to 35% of colloidal graphite in a matrix of copper. Lines can be distinguished from the present invention in that it does not relate to an EDM wire electrode.

In the general field of metallurgy, Olstowski et al. U.S. Pat. No. 3,384,463 disclose a low density, metal body-graphite composite of expanded graphite dispersed through a matrix of metal such as copper. The graphite is a vermicular expanded graphite which is formed by mixing a particulate, natural crystalline graphite with an acid or anodically electrolyzing the graphite in an aqueous acidic or aqueous salt electrolyte. The resulting vermicular graphite can be mixed with pure copper. The graphite metal body composite disclosed in the Olstowski et al. patent can be distinguished from the present invention where the graphite has a natural crystalline structure and is not processed to form vermicular expanded graphite.

More recently, conventional EDM technology has been extended by replacing the rigid electrodes with flexible, wire electrodes. The wire electrodes are advantageous in that they can cut a shape completely through a piece of metal at a significantly increased rate of speed as compared with the speed possible with the conventional electrodes described hereinbefore. An increase in the machining speed can provide a significant competitive advantage because of the decrease in costs associated with skilled labor.

Another important factor associated with the use of wire electrodes for EDM relates to the accuracy with which a flexible, wire electrode cuts as compared with a conventional, rigid electrode. This advantage is achieved because the EDM wire cutting process constantly feeds new wire to the area being machined. Fresh wire ensures that the natural tendency for the wire to erode does not prevent the part size from being kept constant.

Presently, EDM wire electrodes are manufactured from copper, brass and zinc coated copper or brass. Although these wires perform adequately, the machining industry is constantly concerned with improving the machining characteristics of the wire electrodes so as to increase the profitability of the machined products.

It is a problem underlying the present invention to provide a process to form an electrical discharge machining wire electrode and the article formed by the process which can cut faster than prior art EDM wire electrodes.

It is an advantage of the present invention to provide a process to form an electrical discharge machining wire electrode and the article formed by the process which obviates one or more of the limitations and disadvantages of the described prior art arrangements.

It is a further advantage of the present invention to provide a process to form an electrical discharge machining wire electrode and the article formed by the process which is faster than prior arrangements.

It is a still further advantage of the present invention to provide a process to form an electrical discharge machining wire electrode and the article formed by the process which is relatively inexpensive to manufacture.

Accordingly, there is provided an electrical discharge machining wire electrode and a process of forming the wire electrode wherein the primary material of the electrode is selected from the group consisting essentially of brass, copper and alloys thereof. The primary material forms an electrode. The balance is a secondary material consisting essentially of graphite. The electrical discharge machining wire electrode has the particles of the secondary material distributed through the matrix.

BRIEF DESCRIPTION OF THE DRAWINGS

The invention and further developments of the invention are now elucidated by means of preferred embodiments shown in the drawings.

DETAILED DESCRIPTION OF THE PREFERRED EMBODIMENT

The present invention is particularly directed to wire-cut electrical discharge machining and the advantages of improved wire electrode compositions for increasing the speed of the machining process. To more fully appreciate the present invention, a brief description of the principles associated with EDM wire cutting follows.

Figure 1:
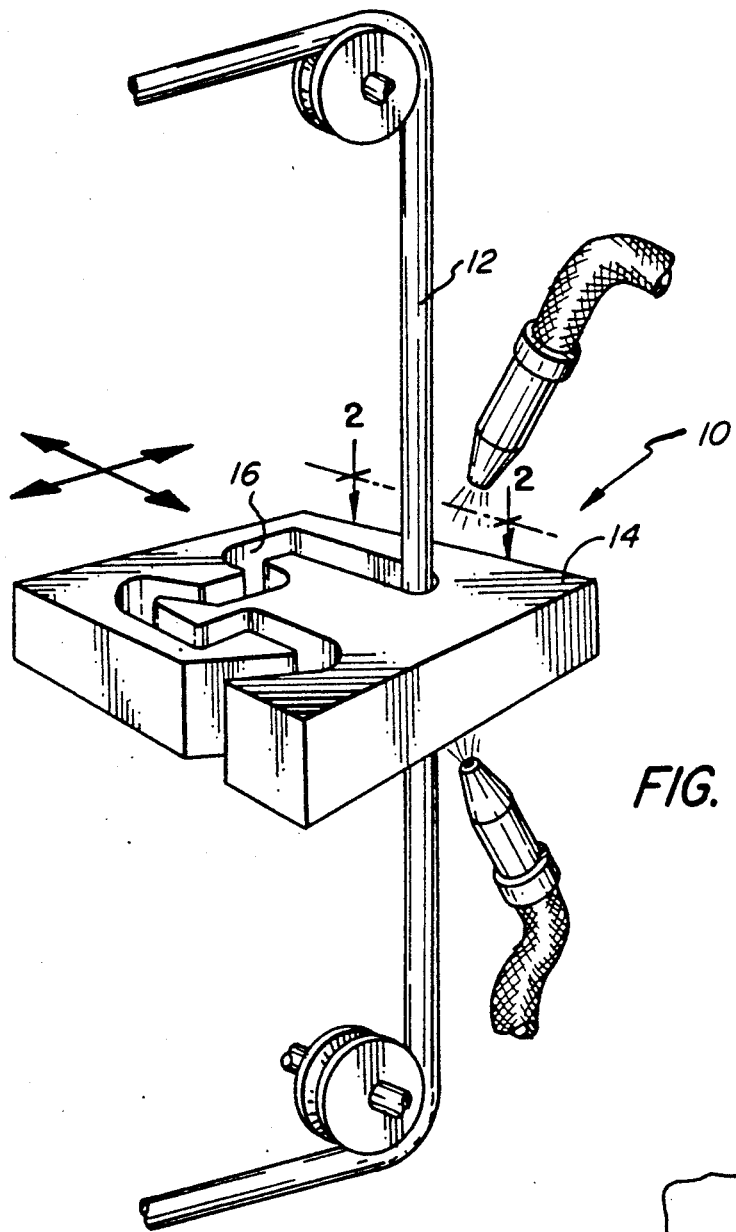
FIG. 1 is a diagrammatical view of a wire-cut electrical discharge machining apparatus.

Referring to FIG. 1, there is illustrated a diagrammatical view of a wire-cut EDM machine which illustrates the machining principle of wire-cut EDM. The wire-cut EDM machine 10 uses a thin wire 12, having a diameter of about 0.02 to about 0.3 mm, as an electrode. The EDM machine 10 machines a workpiece 14 with electrical discharge like a bandsaw by moving either the workpiece or wire. Erosion of the metal utilizing the phenomenon of spark discharge is the same as in conventional EDM discussed hereinbefore. The prominent feature of a moving wire is that a complicated cutout 16 can be easily machined without the problems associated with a forming electrode, i.e., refurnishing the end of the electrode and slower operation speed.

Figure 2:
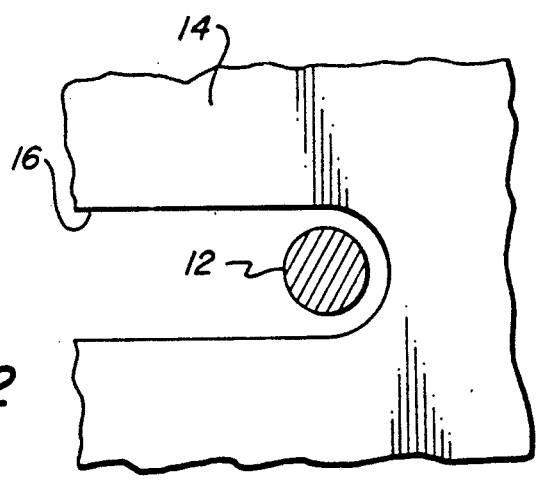
FIG. 2 is a cross-sectional view of the gap between the EDM wire electrode and the workpiece being machined.

Since a thin wire of copper or tungsten is used in wire-cut EDM as an electrode to machine the workpiece as programmed, there is no need for rigid, forming electrodes which are traditionally made by cutting and grinding an expensive alloy of silver and tungsten or copper and tungsten. The wire electrode feature helps reduce man-hour requirements and insures greater economy due to use of a relatively inexpensive electrical material. The consumption of wire on a typical EDM machine, as shown in FIGS. 1 and 2 can be about 0.03 kg/hr. The 0.2-mm-dia copper wire which is most frequently used for wire-cut EDM costs about $20 per spool and one spool of such wire can generally machine for 50 to 60 hours.

The wire electrode is constantly fed during machining, and its wear can be practically ignored. Since a new portion of wire electrode is constantly supplied at a speed, e.g., of 10 to 30 mm/sec., machining can be continued without any accummulation of chips and gases. Being that a very thin, wire electrode is used, an extremely small amount of discharge energy suffices for one spark and the workpiece is machined under conditions for finishing as specified for conventional EDM. This easily provides uniform surfaces of about 5 to 10$\mu$ Rmax and machined dies can be used for production purposes without any polishing.

As to the specific wire compositions, copper, brass, tungsten with or without coatings such as zinc were typically employed as EDM wire electrodes. Although these materials performed in an adequate manner, improved material compositions which enable an increased speed of the machining process provide an important advance in the art since the cost of skilled labor to operate the EDM machinery is a major factor in the total machining costs. With an increased machining speed, the time associated with skilled labor decreases and the machining costs likewise decrease.

The present invention is specifically directed to providing an EDM wire electrode consisting essentially of a primary material selected from the group consisting essentially of brass, copper and alloys thereof. The primary material forms a matrix. The balance of the EDM wire electrode is a secondary material consisting essentially of graphite. The EDM wire electrode is characterized by having the graphite particles of the secondary material distributed through said matrix.

In a first embodiment where the EDM wire electrode is brass, it is thought that the graphite particles can comprise about 3 to about 40 percent by weight of the total composition.

In a second embodiment, where the primary material consists essentially of copper, the secondary material preferably comprises of about 10 to about 40 percent by weight of the total composition.

The EDM wire electrode can have a diameter of about 0.002 to about 0.014 inches.

An important aspect of the present invention relates to the process of manufacturing EDM wire electrodes. The process comprises the steps of: (a) providing a primary material selected from the group consisting essentially of brass, copper and alloys thereof; (b) heating the primary material to the molten state; (c) providing a secondary material consisting essentially of graphite particles; (d) mixing the graphite particles into the molten primary material; and (e) forming the molten mixture of the primary material and the secondary material into the EDM wire electrodes.

The process of forming the EDM wire electrodes also includes the step of selecting the secondary material to comprise a range from about 3 to about 40 percent by weight of the total mixture. This range is particularly relevant when the primary material is brass.

When the embodiment relates to the process of forming an EDM wire electrode from a primary material consisting essentially of copper, the secondary material is selected to comprise from about 10 to about 40 percent by weight of the total mixture.

Once the molten mixture of the primary and secondary materials is prepared, the melt is solidified into wire with a diameter of about 0.002 to about 0.014 inches.

The patents disclosed herein are incorporated in their entireties within this specification.

It is apparent that there has been provided in accordance with this invention a method for electrical discharge machining which satisfies the objects, means, and advantages set forth hereinabove. While the invention has been described in combination with the embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. An electrical discharge machining wire electrode consisting essentially of:
   a primary material selected from the group consisting essentially of copper and copper alloys, said primary material forming a matrix;
   the balance being a secondary material consisting essentially of graphite;
   said electrical discharge machining wire electrode being characterized by having particles of said secondary material distributed through said matrix.

2. The electrical discharge machining wire electrode of claim 1 wherein the secondary material comprises about 3 to about 40 percent by weight of the total composition.

3. The electrical discharge wire electrode of claim 2 wherein the primary material consists essentially of copper.

4. The electrical discharge machining wire electrode of claim 3 wherein the secondary material comprises about 10 to about 40 percent by weight of the total composition.

5. The electrical discharge wire electrode of claim 2 wherein the primary material consists essentially of brass.

6. The electrical discharge wire electrode of claim 2 wherein the primary material consists essentially of copper alloy.

7. The electrical discharge wire electrode of claim 2 wherein the wire has a diameter of about 0.002 to about 0.014 inches.

8. The electrical discharge wire electrode of claim 1 wherein the primary material is a copper alloy, said copper alloy being made of brass.

9. The process of producing electrical discharge machining wire electrode, comprising the steps of:
   providing a primary material selected from the group consisting essentially of copper and copper alloys;
   heating said primary material to the molten state;
   providing a secondary material consisting essentially of graphite particles;
   mixing said graphite particles into the molten primary material; and
   forming the molten mixture of said primary material and the secondary material into said electrical discharge machining wire electrode.

10. The process of forming an electrical discharge machining wire electrode in accordance with claim 9, including the step of selecting the primary material to consist essentially of a copper alloy, said copper alloy being made of brass.

11. The process of forming an electrical discharge machining wire electrode in accordance with claim 9 including the step of selecting the secondary material to comprise from about 3 to about 40 percent by weight of the total mixture.

12. The process of forming an electrical discharge wire electrode in accordance with the process of claim 11 including the step of forming the wire with a diameter of about 0.002 to about 0.014 inches.

13. The process of forming an electrical discharge wire electrode in accordance with the process of claim 11 including the step of selecting the primary material to consist essentially of brass.

14. The process of forming an electrical discharge wire electrode in accordance with the process of claim 11 including the step of selecting the primary material to consist essentially of 15. The process of forming an electrical discharge machining wire electrode in accordance with claim 14 including the step of selecting the secondary material to comprise from about 10 to about 40 percent by weight of the total mixture.

* * * * *